(12) United States Patent
Hirasaka

(10) Patent No.: US 7,372,791 B2
(45) Date of Patent: May 13, 2008

(54) RECORDING/REPRODUCING APPARATUS AND CROSS TALK CANCEL METHOD

(75) Inventor: Hisato Hirasaka, Tokyo (JP)

(73) Assignee: Sony Corporation, Tokyo (JP)

( * ) Notice: Subject to any disclaimer, the term of this patent is extended or adjusted under 35 U.S.C. 154(b) by 707 days.

(21) Appl. No.: 10/500,092

(22) PCT Filed: Dec. 26, 2002

(86) PCT No.: PCT/JP02/13699

§ 371 (c)(1),
(2), (4) Date: Jun. 24, 2004

(87) PCT Pub. No.: WO03/056547

PCT Pub. Date: Jul. 10, 2003

(65) Prior Publication Data
US 2004/0257935 A1    Dec. 23, 2004

(30) Foreign Application Priority Data
Dec. 26, 2001    (JP) .............................. 2001-395078

(51) Int. Cl.
*G11B 5/09*    (2006.01)
*G11B 15/52*    (2006.01)

(52) U.S. Cl. ................. 369/47.17; 369/53.33
(58) Field of Classification Search .............. 369/52.1, 369/53.21, 124.05, 124.13, 124.01, 47.14, 369/53.33, 124.11, 47.17; 360/31, 53, 69, 360/71, 132
See application file for complete search history.

(56) References Cited
U.S. PATENT DOCUMENTS
5,521,945 A * 5/1996 Knudson ................. 360/65

5,991,108 A * 11/1999 Ohta ................. 369/124.05
6,421,196 B1 * 7/2002 Takayama et al. ......... 369/52.1

FOREIGN PATENT DOCUMENTS
JP        60-52902     3/1985
JP        3-232103    10/1991
JP       10-177701     6/1998

* cited by examiner

*Primary Examiner*—Tan Dinh
*Assistant Examiner*—Kim-Kwok Chu
(74) *Attorney, Agent, or Firm*—Frommer Lawrence & Haug LLP; William S. Frommer; Thomas F. Presson

(57) ABSTRACT

The present invention is directed to a recording/reproducing apparatus having a Read After Write function which simultaneously performs recording operation and reproduction operation, and is such that, in a reproducing system (120) of a tape streamer (100) which performs Read After Write operation for signals through a magnetic tape (105), the apparatus serves to distribute reproduction signals obtained from the magnetic tape by a first data distribution switch (133) to store signals thus distributed into frame memories (135A), (135B) of 2 channels, and to distribute a recording signal from a recording system (110) by a second data distribution switch (134) as cause signals of crosstalk signals included in reproduction signals to store signals thus distributed into frame memories to generate pseudo crosstalk signals of respective channels by crosstalk cancellers (136A), (136B) on the basis of reproduction signals and cause signals of respective channels which are read out from the frame memories to cancel, every channel, crosstalk signals included in reproduction signals of respective channels.

9 Claims, 12 Drawing Sheets

FIG.7A WSWP
FIG.7B WR1
FIG.7C WR2
FIG.7D RSWP
FIG.7E PB1
FIG.7F PB2

RECORDING/REPRODUCING APPARATUS AND CROSS TALK CANCEL METHOD

TECHNICAL FIELD

The present invention relates to a recording/reproducing apparatus adapted for Read After Write operation for signals through recording medium, and a crosstalk cancellation method of canceling crosstalk included in reproduction signals obtained in that reproducing system.

This Application claims priority of Japanese Patent Application No. 2001-395078, filed on Dec. 26, 2001, the entirety of which is incorporated by reference herein.

BACKGROUND ART

Hitherto, realization of high transfer rate with respect to data recording/reproducing apparatus with improvement in processing speed of computer and increase in data quantity being as the background has been required. In order to allow the recording/reproducing apparatus to have high transfer rate, realization of high frequency of recording/reproduction signal is necessary. As one of the fundamental problem which obstructs realization of high frequency, operating speed of the reproduction signal processing circuit is mentioned. For example, in an apparatus employing Trellis code modulate system which is the advanced digital modulation system, since the maximum likelihood decode calculating circuit for binarizing (discriminating) reproduction signal requires vast operation quantity, this is the problem in improvement in operating speed. Although the maximum likelihood decoding system is not described in detail here, it will be expected in future that more complicated digital modulation systems are developed for the purpose of improvement in error rate. As a result, there is the possibility that vast calculation quantity may not be processed on the real time basis.

Here, in the real time processing, arithmetic operation is carried out for high rate reproduction signals, which have been converted from analog to digital under the AD (Analog to Digital) conversion, without changing rate. Namely, when reproduction signal channel rate is 100 MHz, a signal processing circuit also processes data or signals with the same 100 MHz rate. In all the apparatuses in practical use at present, data or signals are processed under the real time processing.

Here, a tape streamer 400 which performs real time processing will be explained with reference to FIG. 1.

The tape streamer 400 is a magnetic recording/reproducing apparatus of the helical scan type which has a rotation drum unit composed of a rotation drum and a fixed drum, and is adapted for recording data to a magnetic tape 401 wound on the rotation drum unit over 180° when viewed from the drum center and for reproducing thus recorded data. The rotation drum has recording heads W1, W2 and reproducing heads R1, R2 arranged thereon. The recording heads W1, W2 are arranged on opposite sides of the rotation drum, or are so arranged as to be apart from each other by 180° when viewed from the drum center, and also the reproducing heads R1, R2 are arranged on the rotation drum similarly.

In a recording system 410 of this tape streamer 400, recording data of data rate of 100 MHz is distributed and delivered, through a recording head changeover switch 411, to recording amplifiers 412A, 412B, at which recording data are amplified. The recording data thus amplified are delivered, through rotary transformers 413A, 413B, to a pair of recording heads W1 and W2 provided at the rotation drum.

The recording head changeover switch 411 is caused to undergo switching control by recording head switching signal WSWP in such a manner that recording data WR1 is given as a recording signal of the first channel to the first recording head W1 for 180° time period during which the first recording head W1 is slidably in contact with the magnetic tape 401, and recording data WR2 is given as a recording signal of the second channel to the second recording head W2 for 180° time period during which the second recording head W2 is slidably in contact with the magnetic tape 401.

In a reproducing system 420, reproduction RF signals of 2 channels respectively having about 0.1 mV obtained by scanning, by a pair of reproducing heads R1, R2, respective recording tracks of the magnetic tape 401 on which recording data is recorded by a pair of recording heads W1, W2 of the recording system 410 provided at the rotation drum are amplified by reproduction amplifiers 421A, 421B of 2 channels disposed in the vicinity of the heads for the purpose of avoiding noise mixing, and are delivered to the fixed drum side through rotary transformers 422A, 422B. The reproduction RF signal thus obtained is delivered to a reproduction processing system 430 through a reproduction head changeover switch 423.

The reproduction head changeover switch 423 is caused to undergo switching control by reproducing head switching signal RSWP in such a manner that reproduction RF signal of the first channel obtained for 180° time period during which the first reproducing head R1 is slidably in contact with the magnetic tape 401 is selected, and reproduction RF signal of the second channel obtained for 180° time period during which the second reproducing head R2 is slidably in contact with the magnetic tape 401 is selected.

The reproduction processing system 430 is composed of an equalizing circuit 431 which is cascade-connected to the reproduction head changeover switch 423, an Analog to Digital Converter (ADC) 432, a PLL circuit 435, and a reproduction signal discrimination circuit 436.

The equalizing circuit 431 adjusts gain and/or phase frequency response so that channel transfer characteristic of the reproduction RF signal delivered through the reproduction head changeover switch 423 results in a desired characteristic. An output of the equalizing circuit 431 is digitized at the ADC 432, and is delivered, as reproduction RF data, to the reproduction signal discrimination circuit 436 such as Viterbi decoder, etc. through the PLL circuit 435.

Here, since it is necessary to sample clock (ADC clock) of the ADC 432 by sampling frequency more than channel frequency of 100 MHz, it is required that ADC clock ≧100 MHz.

The PLL circuit 435 extracts channel clock (reproduction clock) of 100 MHz from reproduction RF signal which has been caused to undergo waveform equalization by the equalizing circuit 431. The reproduction clock is utilized as operating clock of all signal processing circuits of the succeeding stage.

The reproduction signal discrimination circuit 436 binarizes reproduction RF data to output it as reproduction data.

In the reproducing system 420 in this tape streamer 400, all circuits must operate at the channel frequency (100 MHz). When either one of circuits has operating speed less than 100 MHz, bit missing would take place. Such signal processing synchronous with the channel frequency is called real time processing. Since there is a tendency that the channel frequency rises in order to meet requirement of realization of high transfer rate, real time processing becomes more difficult.

Here, the term opposite to the real time processing is post processing. Namely, this system is a system of temporarily storing, into frame memory, reproduction signal of high rate converted Analog to Digital (AD conversion) to read it at rate lower than that in AD conversion to process the reproduction signal at low rate, i.e., to perform post processing to thereby lessen load of the operating speed of the reproduction signal processing circuit. The recording/reproducing apparatus which has been put into use by post processing does not yet exist, but is used at the experimental stage, and has been put into use in measurement instrument.

Then, outline of the post processing circuit will be explained with reference to FIG. 2.

A reproducing system 420A shown in FIG. 2 serves to perform post processing at the reproduction processing system 430 of the reproducing system 420 in the tape streamer 400, and comprises, at a reproduction processing system 430A, frame memories 434A, 434B, PLL circuits 435A, 435B and signal discrimination circuits 436A, 436B of 2 channels which are respectively cascade-connected to a switch 433 for distributing reproduction RF data digitized by the ADC 432 to 2 channels.

The switch 433 is driven by reproduction head switching signal RSWP to distribute and deliver reproduction RF data of the first channel in which reproduction RF signal obtained by the first reproducing head RI has been digitized by the ADC 432 and reproduction RF data of the second channel in which reproduction RF signal obtained by the second reproducing head R2 has been digitized by the ADC 432 to the frame memories 434A, 434B of 2 channels. The reproduction RF data of the first channel is stored into the first frame memory 434 A at 100 MHz rate, and reproduction RF data of the second channel is stored into the second frame memory 434B at 100 MHz rate. The store operations with respect to the respective frame memories 434A, 434B have duty ratio of 50%.

In FIG. 2, the right side partitioned by dotted lines is a post processing circuit 450. Since the post processing circuit 450 operates at duty 100%, low speed of half rate (50 MHz) can be attained. If this technology is developed to provide four frame memories, it is possible to perform signal processing at 25 MHz rate.

In general, in broadcast equipment for business and/or computer back-up unit (tape streamer), etc., design is made such that confirmation operation called Read After Write (RAW), which reproduce data immediately after recording the data to confirm whether or not the data is correctly recorded, can be executed.

It is to be noted that discrimination as to whether or not data is correctly recorded is conducted by judgment of magnitude of reproduction signal voltage in the analog VTR, and is conducted by judgment of error rate in tape streamer which performs digital recording. Most cases where data is not correctly recorded are the cases where medium is defective and/or dust is attached on the head surface.

Here, operation immediately after recording in RAW does not mean that tape is rewound from the time when recording is completed to reproduce data, but means data is reproduced just immiediately after the data is recorded by the recording head. For example, in the magnetic recording/reproducing apparatus of the helical scan system, there is employed a configuration such that RAW operation is conducted by the next drum rotation of the recording drum rotation. In the magnetic recording/reproducing apparatus of the linear system, there is employed a configuration such that reproducing heads are disposed at the backward position of the recording head to thereby perform RAW operation.

Meanwhile, in the case where RAW function is realized in the tape streamer 400 of the helical scan system, recording heads W1, W2,reproducing heads R1, R2, rotary transformers 413A, 413B for recording and rotary transformers 422A, 422B for reproduction which transmit signals thereto, etc., which are disposed at close distances, operate at the same time. From this fact, in order to suppress crosstalk interference where recording signal is mixed into very weak reproduction signal, it is necessary to employ, e.g., as shown in FIG. 3, strong shield structure which electromagnetically shields the recording system 410 and the reproducing system 420 therebetween. Namely, recording signals delivered to recording heads W1, W2 through rotary transformers 413A, 413B from recording amplifiers 412A, 412B are signals of large amplitude ranging to 10 V, whereas reproduction RF signals obtained at reproducing heads R1, R2 from the magnetic tape 401 are very small amplitude signal of the order of 0.1 mV, and its voltage ratio is fifth power of 10. Accordingly, shield as large as 100 dB must be implemented to recording signal. In order to obtain shield effect as large as 100 dB, space for inserting shield material is required. Employment of strong shield structure obstructs miniaturization of drum, leading to the cause to obstruct miniaturization of equipment.

As a technology for suppressing crosstalk interference from recording signal to reproduction signal by signal processing without employment of the shield structure in order to suppress crosstalk interference from recording signal to reproduction signal, e.g., technologies to subtract pseudo recording signal crosstalk generated by passing recording signal through the adaptive filter from reproduction signal to thereby remove crosstalk component of recording signal mixed into reproduction signal are disclosed in the Japanese Patent Application Laid Open No. 245307/1997 publication and/or the Japanese Patent Application Laid Open No. 177701/1998 publication.

If such crosstalk cancellation means is provided, error rate of RAW is improved. As a result, sense (detection) accuracy of head stain and/or tape defective which is the object of RAW is improved. Thus, this contributes to realization of high reliability of equipment.

Meanwhile, since crosstalk canceller is a circuit for canceling leakage of recording data, arithmetic processing had to be performed at recording data rate. Namely, real time processing had to be performed, and it was required to dispose crosstalk canceller at the preceding stage of frame memory. Accordingly, the crosstalk canceller is not permitted to undergo post processing, and the crosstalk canceller is required to perform 100 MHz rate operation. Thus, there is the possibility that the crosstalk canceller results in cause of obstacle (obstruction) to realization of high transfer rate.

DISCLOSURE OF THE INVENTION

An object of the present invention is to provide a novel recording/reproducing apparatus and a novel crosstalk cancellation method which can solve problems that conventionally used recording/reproducing apparatuses as described above and crosstalk cancellers used in such recording/reproducing apparatuses have.

Another object of the present invention is to provide a recording/reproducing apparatus and a crosstalk cancellation method in which, in a recording/reproducing apparatus having Read After Write (RAW) function to simultaneously perform recording operation and reproduction operation, crosstalk cancellation by post process is permitted so that high transfer rate can be easily realized.

In the present invention, extension bit for storing recording data is provided in a frame memory to move recording signal crosstalk canceller to post processing portion. Namely, since crosstalk cause signal series is necessary in crosstalk canceling circuit, if such crosstalk cause signal series is also stored into the frame memory, crosstalk cancellation can be preformed in the post process. Here, the crosstalk cause signal series is recording data.

The present invention is directed to a recording/reproducing apparatus adapted for carrying out Read After Write operation for signals through a recording medium, and comprises first distribution means for distributing reproduction signals obtained from the recording medium to plural channels, second distribution means for distributing cause signals of crosstalk signals included in the reproduction signals obtained from the recording medium to plural channels, memory means of plural channels for storing, every channel, reproduction signals and cause signals which have been distributed to plural channels by the first and second distribution means, and crosstalk cancellers of plural channels for generating pseudo crosstalk signals of respective channels on the basis of reproduction signals and cause signals of respective channels which are read out from the memory means of plural channels to cancel crosstalk signals included in reproduction signals of respective channels, wherein, in the reproducing system, there are obtained reproduction signals of plural channels in which crosstalk signals have been cancelled every channel by the crosstalk cancellers of plural channels.

The present invention is directed to a crosstalk cancellation method of canceling crosstalk included in reproduction signals obtained at a reproducing system of a recording/reproducing apparatus adapted for performing Read After Write operation for signals through a recording medium, the crosstalk cancellation method comprising: distributing reproduction signals obtained from the recording medium to plural channels to store them into memory means of plural channels, and distributing cause signals of crosstalk signals included in reproduction signals obtained from the recording medium to plural channels to store them into memory means of plural channels; and generating pseudo crosstalk signals of respective channels on the basis of reproduction signals and cause signals of respective channels which are read out from the memory means of plural channels to cancel, every channel, crosstalk signals included in reproduction signals of respective channels.

Still more further objects of the present invention and practical merits obtained by the present invention will become more apparent from the description of the embodiments which will be given below with reference to the attached drawings.

BEST MODE FOR CARRYING OUT THE INVENTION

Explanation will be given in detail below with reference to the attached drawings in connection with the embodiments of the present invention.

Figure 1:
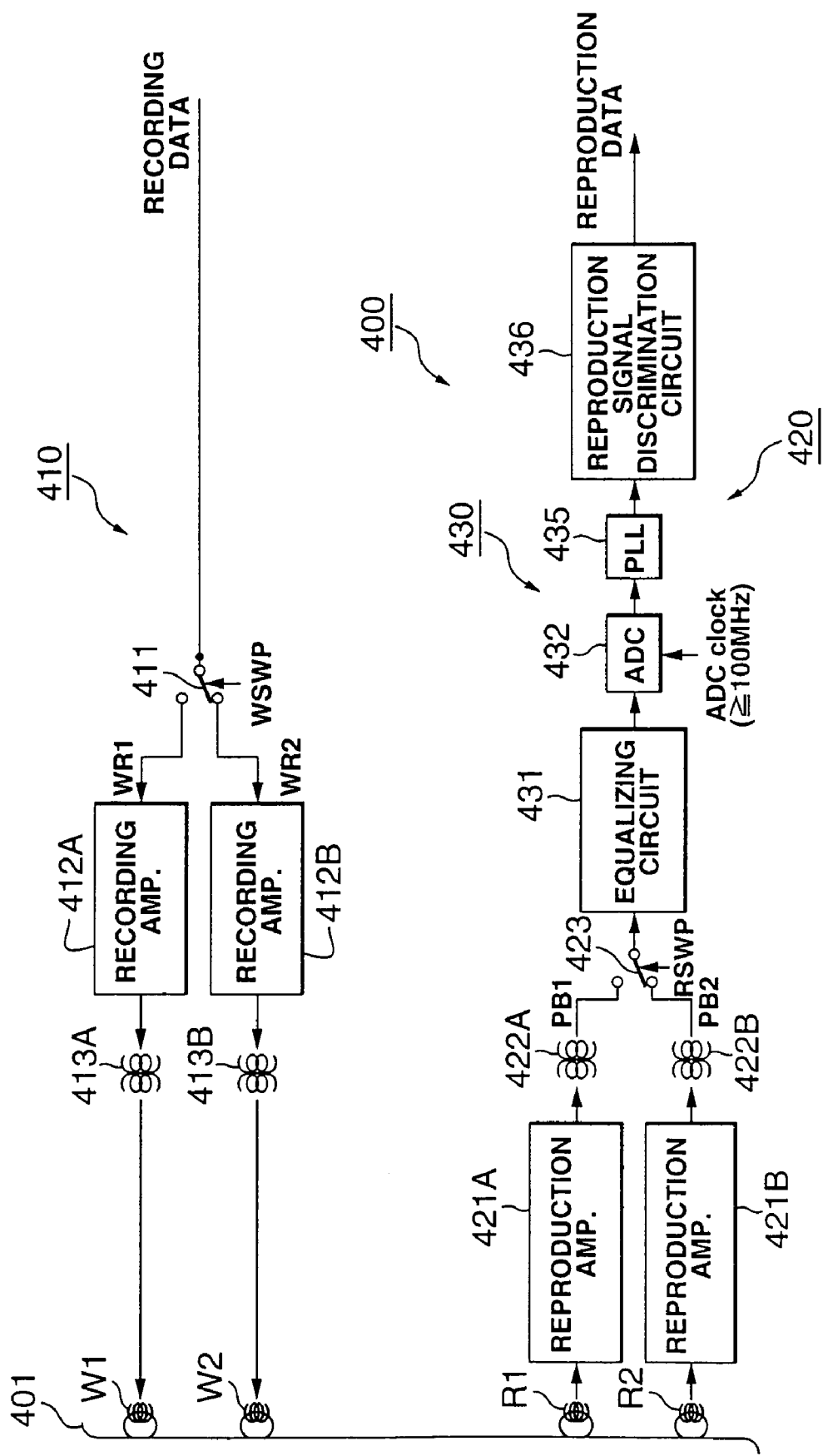
FIG. 1 is a block diagram showing an example of a conventional tape streamer.
Figure 2:
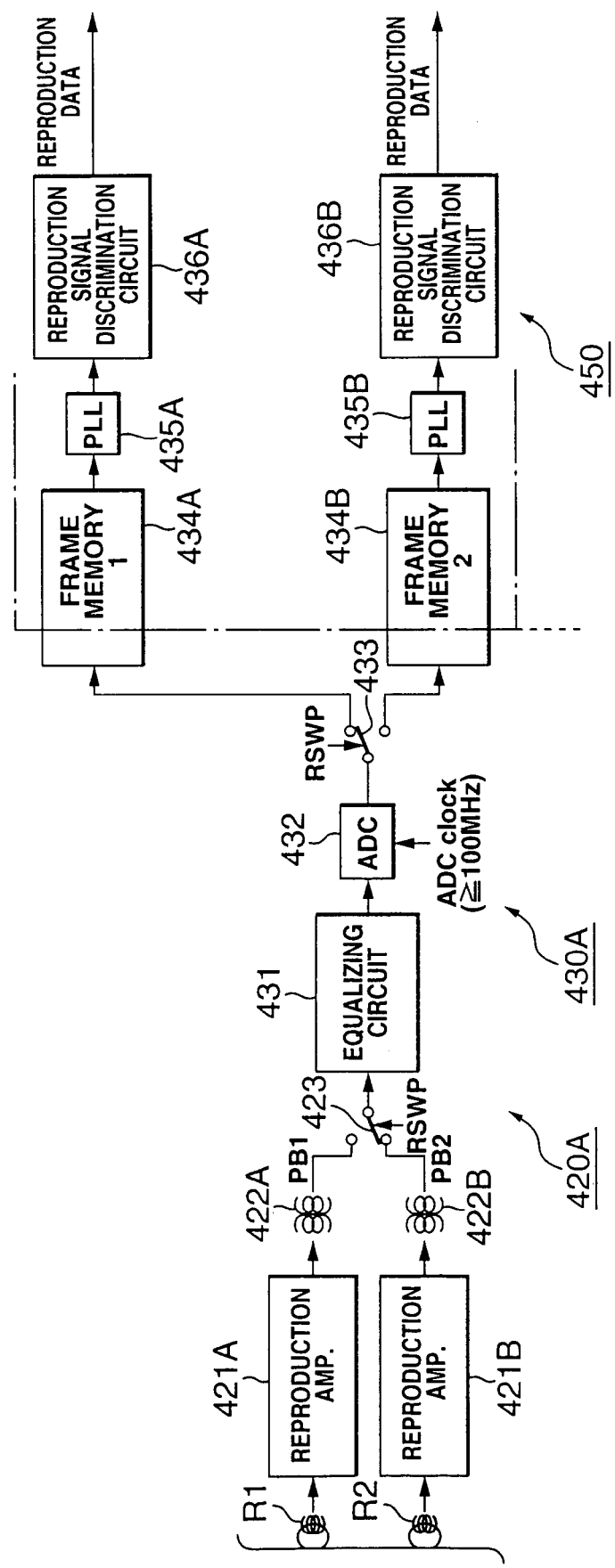
FIG. 2 is a block diagram showing the essential part configuration of reproducing system for performing post processing in the tape streamer shown in FIG. 1.
Figure 3:
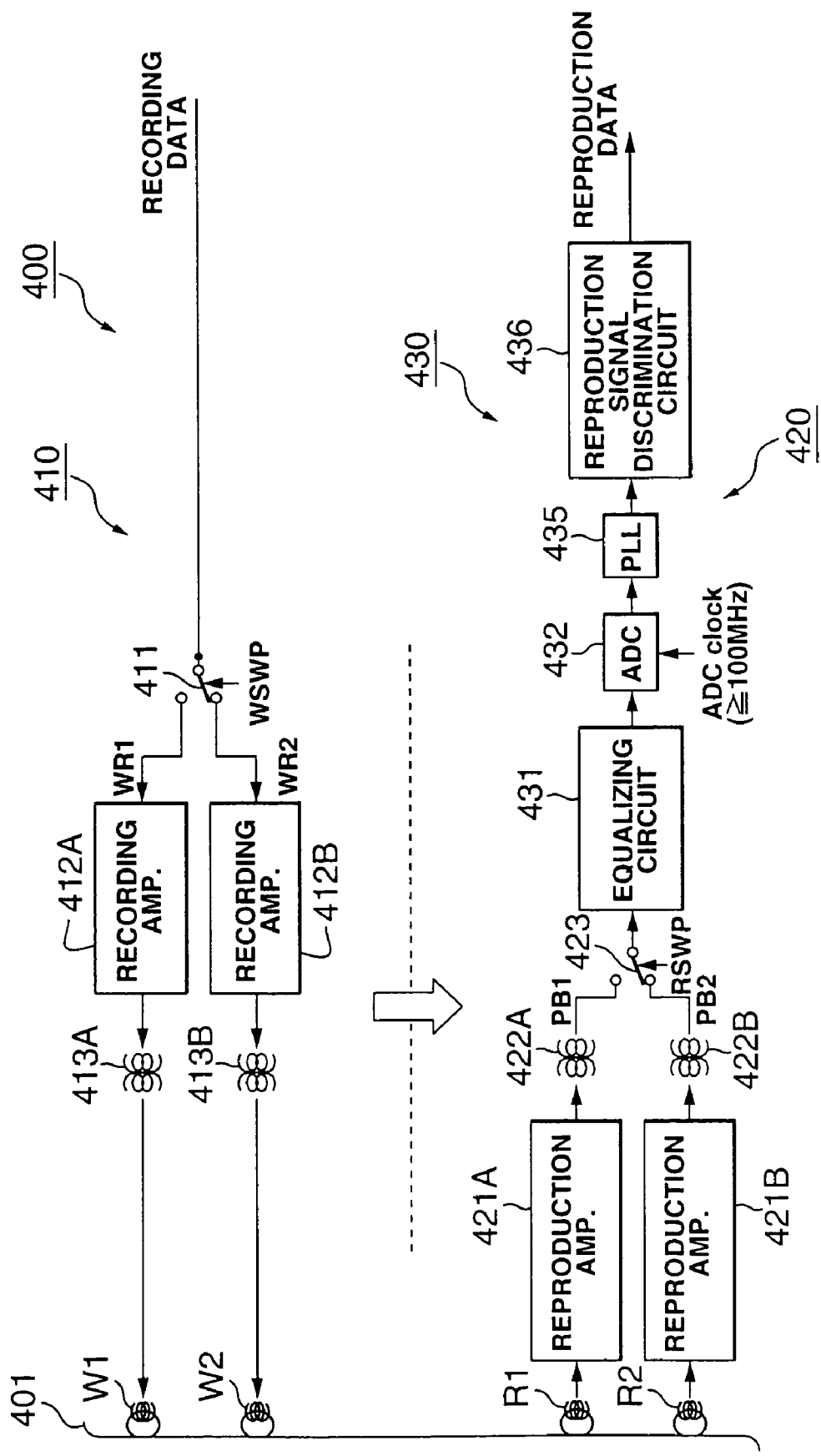
FIG. 3 is a block diagram showing the essential part configuration for explaining measure for crosstalk in the conventional tape streamer.
Figure 4:
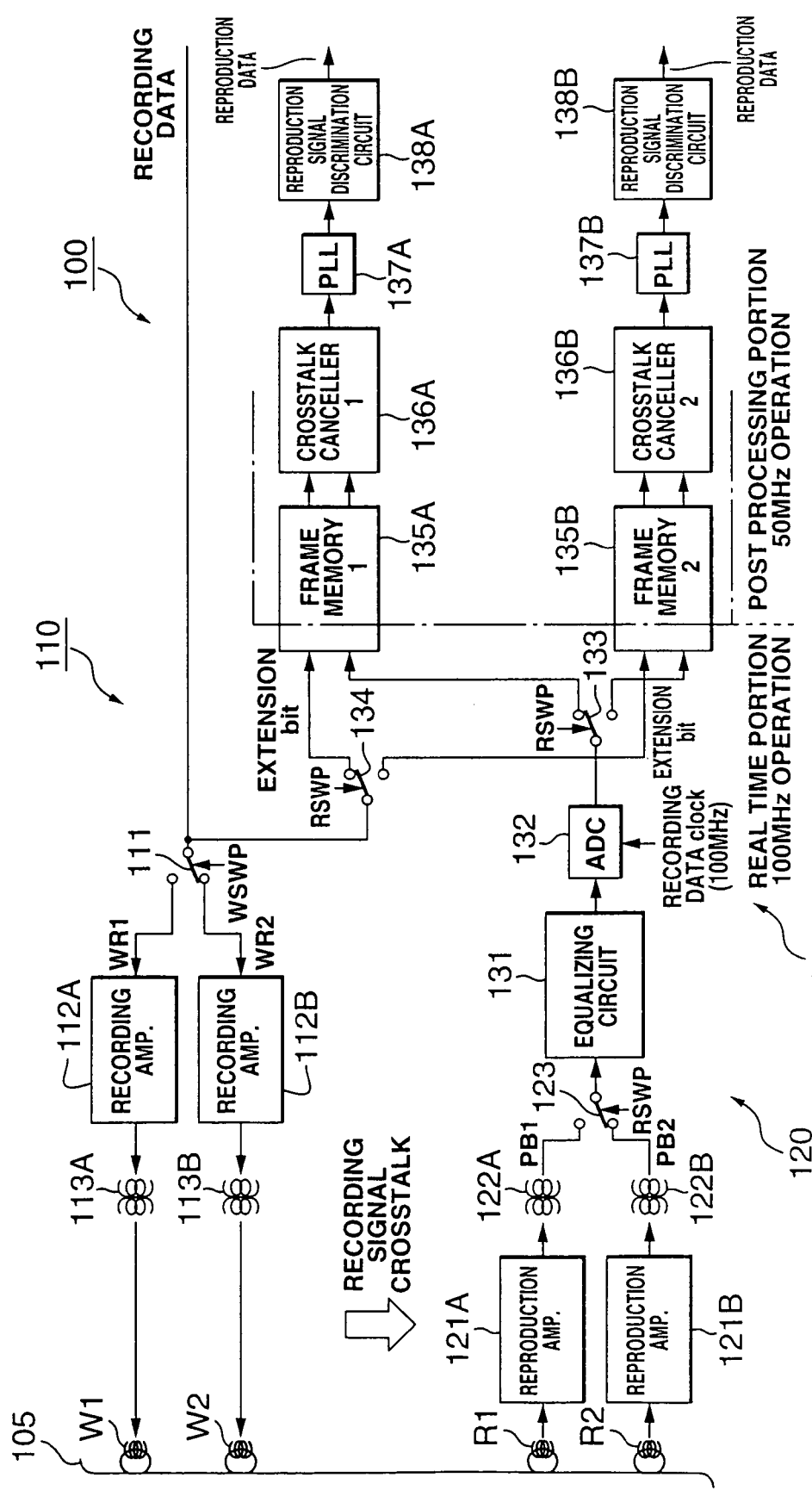
FIG. 4 is a block diagram showing the essential part configuration of tape streamer in conformity with the DDS4 standard to which the present invention is applied.

FIG. 4 is a block diagram showing the configuration of a tape streamer 100 in conformity with DDS (Digital Data Storage) 4 standard to which the present invention is applied.

Figure 5:
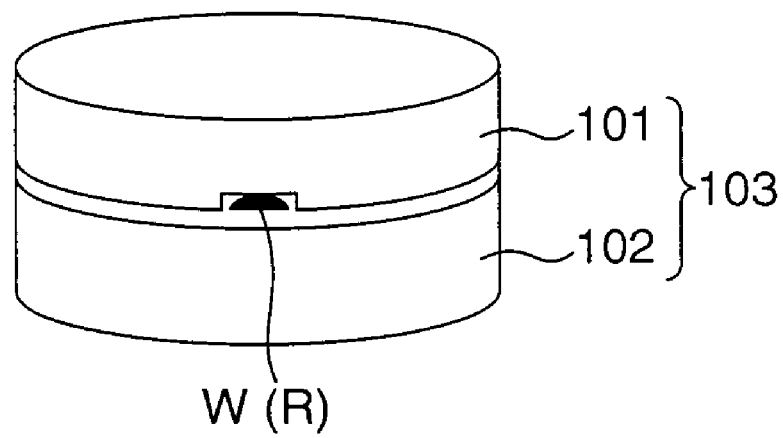
FIG. 5 is a perspective view showing the configuration of helical scan rotation drum in the tape streamer.
Figure 6:
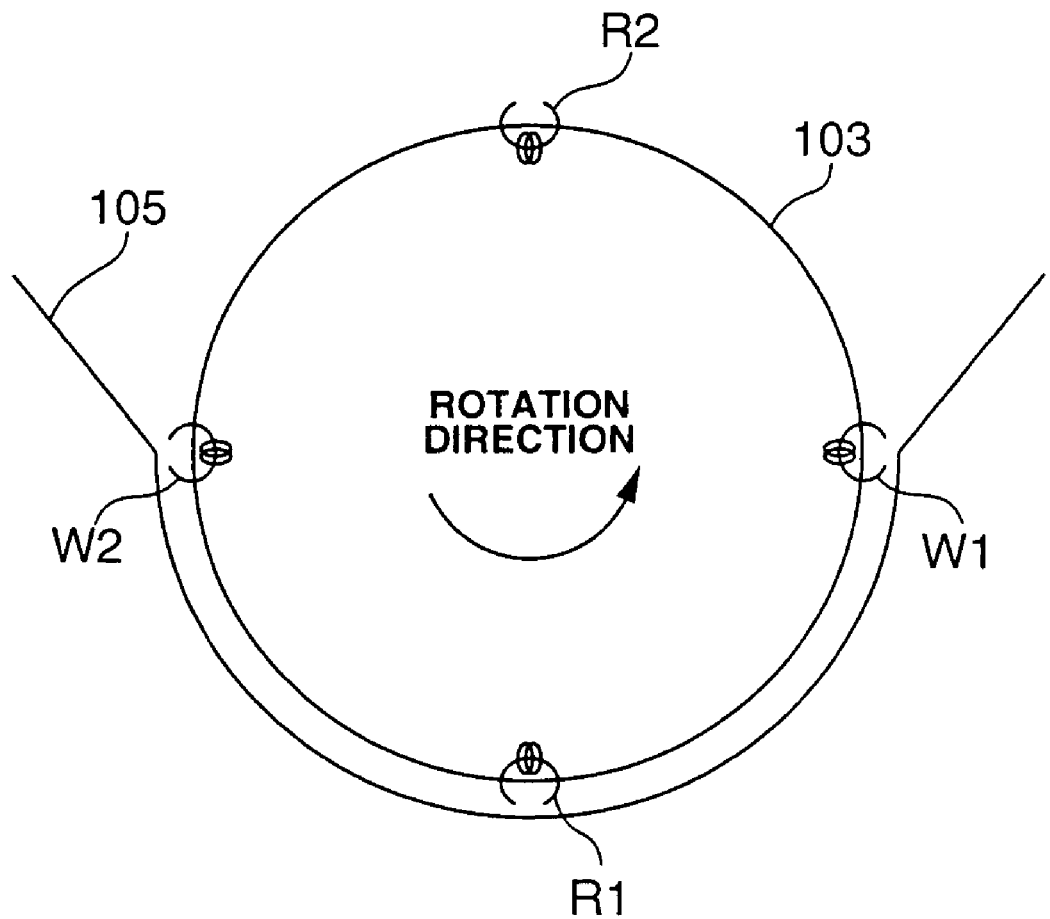
FIG. 6 is a plan view showing, in a model form, head arrangement and tape winding state in the helical scan rotation drum.

As shown in FIGS. 5 and 6, the tape streamer 100 according to the present invention is a magnetic recording/reproducing apparatus of the helical scan type which has a rotation drum unit 103 composed of a rotation drum 101 and a fixed drum 102, and is adapted for recording/reproducing data through a magnetic tape 105 wound on the rotation drum unit 103 over 180° when viewed from the drum center. The recording heads W1, W2 are arranged on opposite sides of the rotation drum 101, or are so arranged as to be apart from each other by 180° when viewed from the drum center, and also the reproducing heads R1, R2 are arranged on the rotation drum 101 similarly.

In a recording system 110 of this tape streamer 100, recording data of data rate of 100 MHz is delivered to recording amplifiers 112A, 112B of 2 channels through a recording head changeover switch 111, and the recording data thus obtained are delivered, through rotary transformers 113A, 113B, to a pair of recording heads W1, W2 provided at the rotation drum 101 as a recording signal amplified so as to have about 10 V. Thus, such recording data are recorded onto recording tracks of the magnetic tape 105.

As shown in FIGS. 7A to 7F, the recording head changeover switch 111 is caused to undergo switching control by recording head switching signal WSWP in such a manner that recording data WR1 is given to the first recording head W1 as a recording signal of the first channel for 180° time period during which the first recording head W1 is slidably in contact with the magnetic tape 105, and recording data WR2 is given to the second recording head W2 as a recording signal of the second channel for 180° time period during which the second recording head W2 is slidably in contact with the magnetic tape 105. The time period during which the recording data WR1 is given to the first recording head W1 as a recording signal corresponds to the time period of head switching signal WSWP=Low. In addition, the time period during which the recording data WR2 is given to the second recording head W2 as a recording signal corresponds to the time period of head switching signal WSWP=High.

At a reproducing system 120, reproduction RF signals of 2 channels respectively having about 0.1 mV obtained by scanning, by a pair of reproducing heads R1, R2, respective recording tracks of the magnetic tape 105 on which recording data is recorded by a pair of recording heads W1, W2 of the recording system 110 provided at the rotation drum 101 are amplified at reproduction amplifiers 121A, 121B of 2 channels disposed in the vicinity of the heads for the purpose of avoiding noise mixing, and are delivered to the fixed drum 102 side through rotary transformers 122A, 122B. The reproduction RF signals thus obtained are delivered to a reproduction processing system 130 through a reproduction head changeover switch 123.

Figure 7:
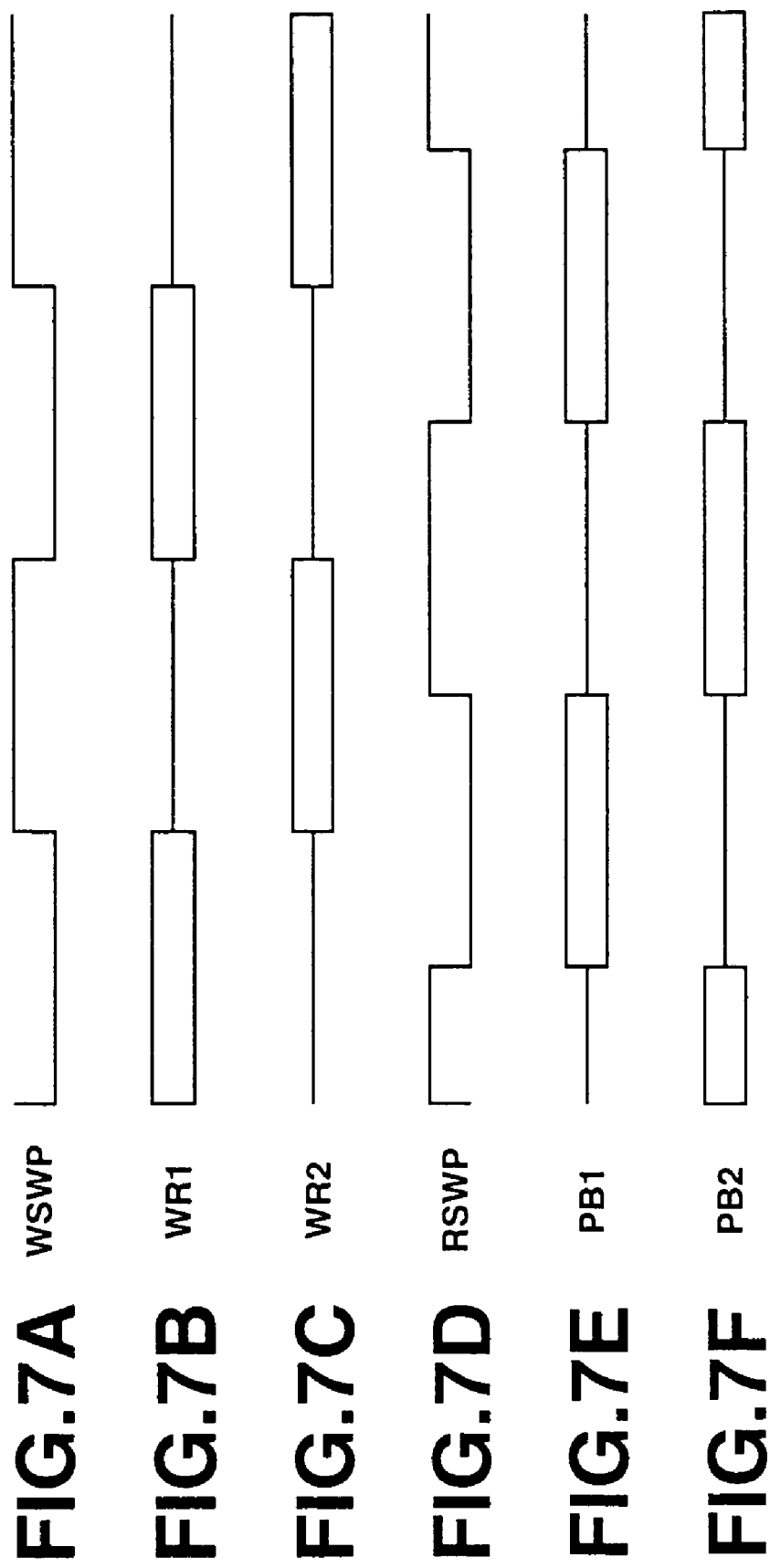
FIGS. 7A to 7F are timing charts showing switching timings of recording signal and reproduction signal in the tape streamer.
Figure 8:
FIGS. 8A to 8F are timing charts showing the operation of real time processing and post process processing in the reproducing system of the tape streamer.

As shown in FIG. 7, the reproduction head changeover switch 123 is caused to undergo switching control by reproduction head switching signal RSWP in such a manner that reproduction RF signal PB1 of the first channel obtained for 180° time period during which the first reproducing head R1 is slidably in contact with the magnetic tape 105 is selected, and reproduction RF signal PB2 of the second channel obtained for 180° time period during which the second reproducing head R2 is slidably in contact with the magnetic tape 105 is selected. The time period during which the reproduction RF signal PB1 of the first channel is selected corresponds to the time period of reproduction head switching signal RSWP=Low. In addition, the time period during which the reproduction RF signal PB2 of the second channel is selected corresponds to the time period of reproduction head switching signal RSWP=High.

A reproduction processing system 130 is composed of an equalizing circuit 131 connected to the reproduction head changeover switch 123, an Analog to Digital Converter (ADC) 132 supplied with reproduction RF signal equalized by this equalizing circuit 131, a first data distribution switch 133 for distributing reproduction RF data digitized by this ADC 132 to 2 channels, a second data distribution switch 134 for distributing recording data delivered from the recording system 110 to 2 channels, frame memories 135A, 135B of 2 channels to which reproduction RF data is distributed and delivered through the first data distribution switch 133 and recording data is distributed and delivered through the second data distribution switch 134, crosstalk cancellers 136A, 136B, PLL circuits 137A, 137B, and reproduction signal discrimination circuits 138A, 138B.

In the reproduction processing system 130, the equalizing circuit 131 adjusts gain and/or phase frequency response so that the channel transfer characteristic of reproduction RF signal delivered through the reproduction head changeover switch 123 results in a desired characteristic. It is to be noted that while there are various systems such as PR1, or PR4, etc. as the magnetic recording channel transfer characteristic, since such magnetic recording channel transfer characteristic is not directly related to this application, it is not described in detail. Reproduction RF signal which has been caused to undergo waveform equalization by this equalizing circuit 131 is digitized at the ADC 132 driven by recording clock (100 MHz) of the recording system 110, and is distributed and delivered to the frame memories 135A, 135B of 2 channels through the first data distribution switch 133 as reproduction RF data.

Here, extension bit of 1 bit is provided in the frame memories 135A, 135B for the purpose of storing crosstalk cause signal. Since binary recording signal series is stored, it is sufficient that extension bit is 1 bit.

Recording data delivered as crosstalk cause signal from the recording system 110 is distributed to 2 channels by the second data distribution switch 134, and respective distributed signals are delivered to respective extension bits of the frame memories 135A, 135B.

At the crosstalk cancellers 136A, 136B, with respect to reproduction RF data of 2 channels stored in the frame memories 135A, 135B, recording signal crosstalk is cancelled by post process on the basis of recording data, i.e., crosstalk cause signal stored in extension bits of the frame memories 135A, 135b.

The reproduction RF data of 2 channels in which recording signal crosstalk has been cancelled by the crosstalk cancellers 136A, 136B are delivered to the reproduction signal discrimination circuits 138A, 138B through the PLL circuits 137A, 137B.

At the PLL circuits 137A, 137B, channel clocks (reproduction clocks) are extracted from reproduction RF data in which recording signal crosstalk has been cancelled.

The reproduction signal discrimination circuits 138A, 138B binarize reproduction RF data to output them as reproduction data.

In the reproducing system 120 in this tape streamer 100, as shown in FIGS. 8A to 8F, signal processing in which reproduction RF data of 100 MHz rate that the ADC 132 generates are alternately written into the frame memories 135A, 135B of 2 channels at store duty ratio 50% is real time processing of 100 MHz, and signal processing with respect to reproduction RF data of 2 channels which have been read out from the frame memories 135A, 135B at duty ratio 100% is post process processing of 50 MHz.

Figure 9:
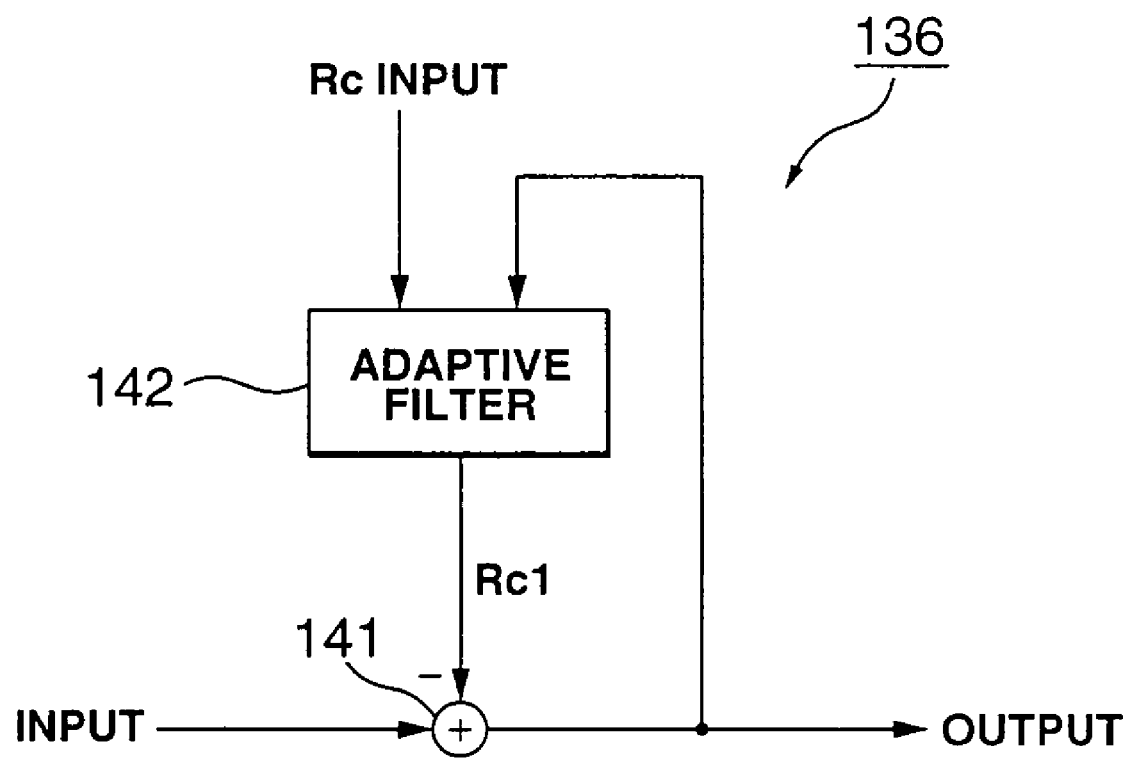
FIG. 9 is a block diagram showing the configuration of crosstalk canceller in the tape streamer.

Here, as the crosstalk cancellers 136A, 136B, there is used, e.g., crosstalk canceller of the configuration as shown in FIG. 9.

The crosstalk canceller 136 shown in FIG. 9 comprises a subtraction circuit 141 supplied with reproduction RF data, and an adaptive filter 142 for generating pseudo recording signal crosstalk signal Rc from recording data which is crosstalk cause signal Ra and subtraction output data by the subtraction circuit 141, wherein pseudo recording signal crosstalk signal generated by this adaptive filter 142 is delivered to the subtraction circuit 141.

The subtraction circuit 141 subtracts pseudo recording signal crosstalk signal Ra generated by the adaptive filter 142 from reproduction RF data to thereby cancel recording signal crosstalk.

The adaptive filter 142 generates pseudo recording signal crosstalk signal Rc from recording data and subtraction output data by the subtraction circuit 141, i.e., reproduction RF data in which recording signal crosstalk has been cancelled to deliver the generated pseudo recording signal crosstalk signal Rc to the subtraction circuit 141 to thereby automatically adjust transfer function so as to minimize recording signal crosstalk component included in the subtraction output data by the subtraction circuit 141.

Further, the crosstalk canceller 136 outputs subtraction output data by the subtraction circuit 141, i.e., reproduction RF data in which recording signal crosstalk has been cancelled.

Here, explanation will be given in connection with the configuration and the operation principle of the adaptive filter 142 which generates pseudo recording signal crosstalk signal Rc.

Here, time of sampling data series is assumed to be integer i, and is indicated by suffix of variable. When output value of the subtraction circuit 141 in the crosstalk canceller 136 is assumed to be $v_i$, $v_i$ is expressed by the following formula (1).

$$v_i = s_i + x_i + n_i - y_i \quad (1)$$

s: signal voltage
x: recording signal crosstalk
n: noise that magnetic tape, magnetic head or amplifier generates
y: pseudo recording signal crosstalk Here, when signal voltage $s_i$ and noise $n_i$ are collected to replace them into noise N, $$N_i = s_i + n_i$$

$$v_i = x_i + N_i - y_i \quad (2)$$

Moreover, when both sides of the formula (2) is squared, $$v_i^2 = (x_i - y_i)^2 + 2(x_i - y_i)N_i + N_i^2 \quad (3)$$

In order that the pseudo recording signal crosstalk $y_i$ is optimally approximated to recording signal crosstalk $x_i$, it is sufficient that mean value with respect to time i of the first term of the right side of the formula (3) is minimized. Here, since mean value of noise is equal to zero, when the second term of the right side of the formula (3) is averaged, it becomes equal to zero. The third term of the right side is independent of pseudo recording signal crosstalk $y_i$. Accordingly, if the time mean value of the formula $(_3)$ is minimized, pseudo recording signal crosstalk $y_i$ resultantly optimally approximates recording signal crosstalk $x_i$.

If the adaptive filter 142 is constituted by transversal filter, pseudo recording signal crosstalk $y_i$ at time i is expressed by the following formula (4).

Here, $C_j$ is assumed to be tap coefficient, j is assumed to be tap No., and r is assumed to be recording data.

$$y_i = \Sigma_j C_j r_{i-j} \quad (4)$$

At this time, in order to update tap coefficient $C_j$ so that time means value of the formula (3) is minimized, it is sufficient to update tap coefficient $C_j$ as occasion demands in accordance with the following formula (5)

$$C_j \to C_j - \alpha \frac{\partial V_j^2}{\partial C_j} \quad (5)$$

Here, $\alpha$ is constant for determining convergence speed.

When the formulas (2) and (4) are substituted into the formula (5), the following formula (6) is obtained.

$$C_j \to C_j + 2\alpha r_{i-j} v_{i-m} \quad (6)$$

In practice, when the number of delay clocks of the ADC 132 is assumed to be M, $$C_j \to C_j + 2\alpha r_{i-j-M} v_{i-M} \quad (7)$$

is employed.

Figure 10:
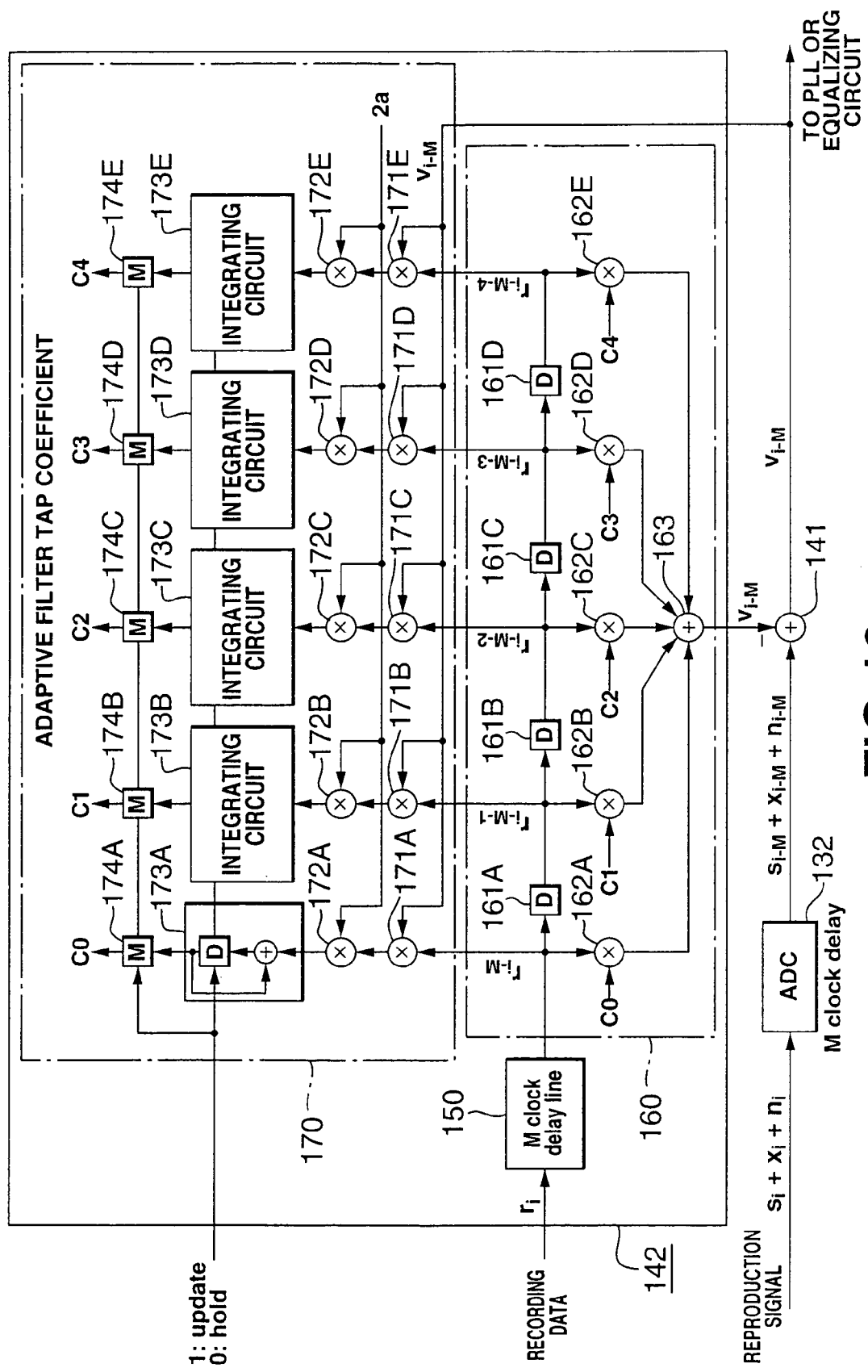
FIG. 10 is a block diagram showing a configuration example of transversal filter used as adaptive filter of the crosstalk canceller.

When the formula (7) is represented by the block diagram of 5 tap transversal filter (j=0, 1, 2, 3, 4), FIG. 10 is provided.

The 5 tap transversal filter (j=0, 1,2,3,4) shown in this FIG. 10 is composed of a filter unit 160 supplied with recording data $r_i$ through an M clock delay circuit 150, and an adaptive filter tap coefficient generating unit 170.

The M clock delay circuit 150 has delay quantity corresponding to the number of delay clocks M of the ADC 132. This M clock delay circuit 150 gives delay quantity corresponding to the number of delay clocks M of the ADC 132 to recording data $r_i$ delivered from the recording system 110.

The filter unit 160 is composed of a D-type flip-flop 161A and a coefficient multiplier 162A which are supplied with recording data $r_{i-M}$ delayed through the M clock delay circuit 150, a D-type flip-flop 161B and a coefficient multiplier 162B which are supplied with recording data $r_{i-M-1}$ further delayed by one clock by the D-type flip-flop 161A, a D-type flip-flop 161C and a coefficient multiplier 162C which are supplied with recording data $r_{i-M-2}$ further delayed by one clock by the D-type flip-flop 161B, a D-type flip-flop 161D and a coefficient multiplier 162D which are supplied with recording data $r_{i-M-3}$ further delayed by one clock by the D-type flip-flop 161C, a coefficient multiplier 162E supplied with recording data $r_{i-M-4}$ further delayed by one clock by the D-type flip-flop 161D, and an adder 163 for adding respective multiplication outputs of the coefficient multipliers 162A~162E. The coefficient multipliers 162A~162E multiply recording data $r_{i-M}$, $r_{i-M-1}$, $r_{i-M-2}$, $r_{i-M-3}$, $r_{i-M-4}$ by adaptive filter tap coefficient $C_j$ (j=0, 1,2, 3, 4) generated by the adaptive filter tap coefficient generating unit 170.

Further, the adaptive filter tap coefficient generating unit 170 is composed of multipliers 171A~171E supplied with recording data $r_{i-M}$, $r_{i-M-1}$, $r_{i-M-2}$, $r_{i-M-3}$, $r_{i-M-4}$, multipliers 172A~172E supplied with multiplication outputs of the multipliers 171A~171E, integrating circuits 173A~173E supplied with multiplication outputs of the multipliers 172A~172E, and memories 174A~174E for storing integral outputs of the integrating circuits 173~173E. The multipliers 171A~171E are supplied with output value $v_{i-M}$ of the subtraction circuit 141 and serves to multiply recording data $r_{i-M}$, $r_{i-M-1}$, $r_{i-M-2}$, $r_{i-M-3}$, $r_{i-M-4}$, by output value $v_i$ of the subtraction circuit 141. The multipliers 172A~172E are supplied with constant $2\alpha$ for determining convergence speed and serve to multiply multiplication outputs of the multipliers 171A~171E by constant $2\alpha$ for determining convergence speed. The memories 174A~174E store integral outputs of the integrating circuits 173A~173E which integrate multiplication outputs of the multipliers 172A~172E to deliver them to the coefficient multipliers 162A~162E of the filter unit 160 as adaptive filter tap coefficient $C_j$ (j=0, 1, 2, 3, 4). As the memories 174A~174E, non-volatile memory is used.

In the adaptive filter 142 using the 5 tap transversal filter (j=0, 1, 2, 3, 4) of such configuration, respective multiplication outputs of the coefficient multipliers 162A~162E which multiply recording data $r_{i-M}$, $r_{i-M-1}$, $r_{i-M-2}$, $r_{i-M-3}$, $r_{i-M-4}$ by adaptive filter tap coefficient $C_j$ (j=0, 1, 2, 3, 4) are added at the adder 163 to thereby implement adaptive filtering processing to recording data $r_{i-M}$ by using adaptive filter tap coefficient $C_j$ (j=0, 1, 2, 3, 4) generated by the adaptive filter tap coefficient generating unit 170 to generate pseudo recording signal crosstalk $y_{i-M}$.

Figure 11:
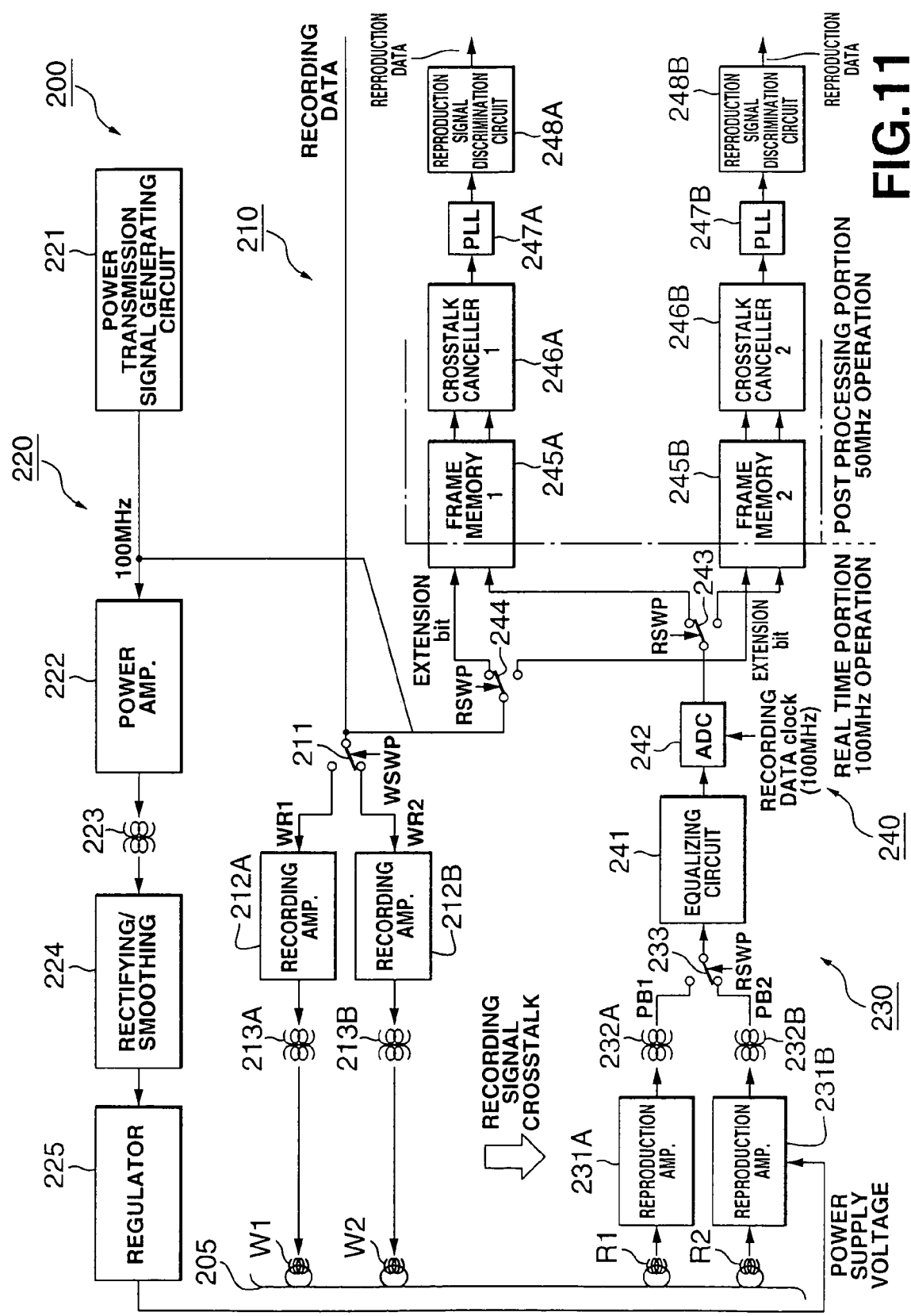
FIG. 11 is a block diagram showing the essential part configuration of tape streamer in which the present invention is applied to cancel recording signal crosstalk and power transmission signal crosstalk in the reproducing system.

Then, FIG. 11 is a block diagram showing the essential part configuration of a tape streamer 200 adapted so that the present invention is applied to cancel, in the reproducing system, recording signal crosstalk and power transmission signal crosstalk.

This tape streamer 200 is composed of a recording system 210, a power transmission system 220 and a reproducing system 230, wherein recording signal crosstalk from the recording system 210 and power transmission signal crosstalk from the power transmission system 220 are cancelled at the reproducing system 230 in a manner as described below.

Namely, in the recording system 210 of the tape streamer 200, recording data of data rate of 100 MHz is delivered to recording amplifiers 212A, 212B of 2 channels through a recording head changeover switch 211. The recording data thus delivered are delivered to a pair of recording heads W1, W2 through rotary transformers 213A, 213B as a recording signal amplified so as to have about 10 V. Thus, such recording data are recorded onto recording tracks of a magnetic tape 205.

In the power transmission system 220 of this tape streamer 200, a power transmission signal of 100 KHz generated by a power transmission signal generating circuit 221 is amplified by a power amplifier 222, and is transmitted to a rectifying/smoothing circuit 224 of the rotation drum side through a rotary transformer 223. By d.c. power supply obtained by rectifying/smoothing power transmission signal transmitted through the rotary transformer 223 by the rectifying/smoothing circuit 224 to further stabilize it by a regulator 225, reproduction amplifiers 231A, 231B of 2 channels disposed in the vicinity of reproducing heads R1, R2 of the reproducing system 230 are driven.

In the reproducing system 230, reproduction RF signals of 2 channels respectively having about 0.1 mV obtained by scanning, by a pair of reproducing heads R1, R2, respective recording tracks of the magnetic tape 205 on which recording data has been recorded by a pair of recording heads W1, W2 of the recording system 210 are amplified at reproduction amplifiers 231A, 231B of 2 channels disposed in the vicinity of the heads for the purpose of avoiding noise mixing, and are delivered to the fixed drum side through rotary transformers 232A, 232B. The reproduction RF signals thus obtained are delivered to a reproduction processing system 240 through a reproduction head changeover switch 233.

The reproduction head changeover switch 233 is caused to undergo switching control by reproduction head switching signal RSWP in such a manner that reproduction RF signal of the first channel obtained for 180° time period during which the first reproducing head R1 is slidably in contact with the magnetic tape 205 is selected, and reproduction RF signal of the second channel obtained for 180° time period during which the second reproducing head R2 is slidably in contact with the magnetic tape 205 is selected. The time period during which the reproduction RF signal of the first channel is selected corresponds to the time period of reproduction head switching signal RSWP=Low. In addition, the time period during which the reproduction RF signal of the second channel is selected corresponds to the time period of reproduction head switching signal RSWP=High.

The reproduction processing system 240 is composed of an equalizing circuit 241 connected to the reproduction head changeover switch 233, an Analog to Digital Converter (ADC) 242 supplied with reproduction RF signal equalized by this equalizing circuit 241, a first data distribution switch 243 for distributing reproduction RF data digitized by this ADC 242 to 2 channels, a second data distribution switch 244 for distributing recording data delivered from the recording system 210 and power transmission signal delivered from the power transmission system 220 to of 2 channels, frame memories 245A, 245B of 2 channels adapted so that reproduction RF data is distributed and delivered through the first data distribution switch 243 and recording data and power transmission signal are distributed and delivered through the second data distribution switch 244, crosstalk cancellers 246A, 246B, PLL circuits 247A, 247B, and reproduction signal discrimination circuits 248A, 248B.

In this reproduction processing system 240, the equalizing circuit 241 adjusts gain and/or phase frequency response so that channel transfer characteristic of reproduction RF signal delivered through the reproduction head changeover switch 233 results in a desired characteristic. The reproduction RF signal which has been caused to undergo waveform equalization by this equalizing circuit 241 is digitized at the ADC 242 driven by recording clock (100 MHz) of the recording system 210, and is distributed and delivered to the frame memories 245A, 245B of 2 channels through the first data distribution switch 243 as reproduction RF data.

Here, in the frame memories 245A, 245B, extension bits of 2 bits are provided for the purpose of storing recording data and power transmission signal as crosstalk cause signal.

The recording data and the power transmission signals are distributed to 2 channels by the second data distribution switch 244, and are delivered to respective extension bits of the frame memories 245A, 245B.

At the crosstalk cancellers 246A, 246B, with respect to reproduction RF data of 2 channels stored in the frame memories 245A, 245B, recording signal crosstalk and power transmission signal crosstalk are cancelled by post process on the basis of recording data and power transmission signal which are stored, as crosstalk cause signal, in extension bits of the frame memories 245A, 245B.

Figure 12:
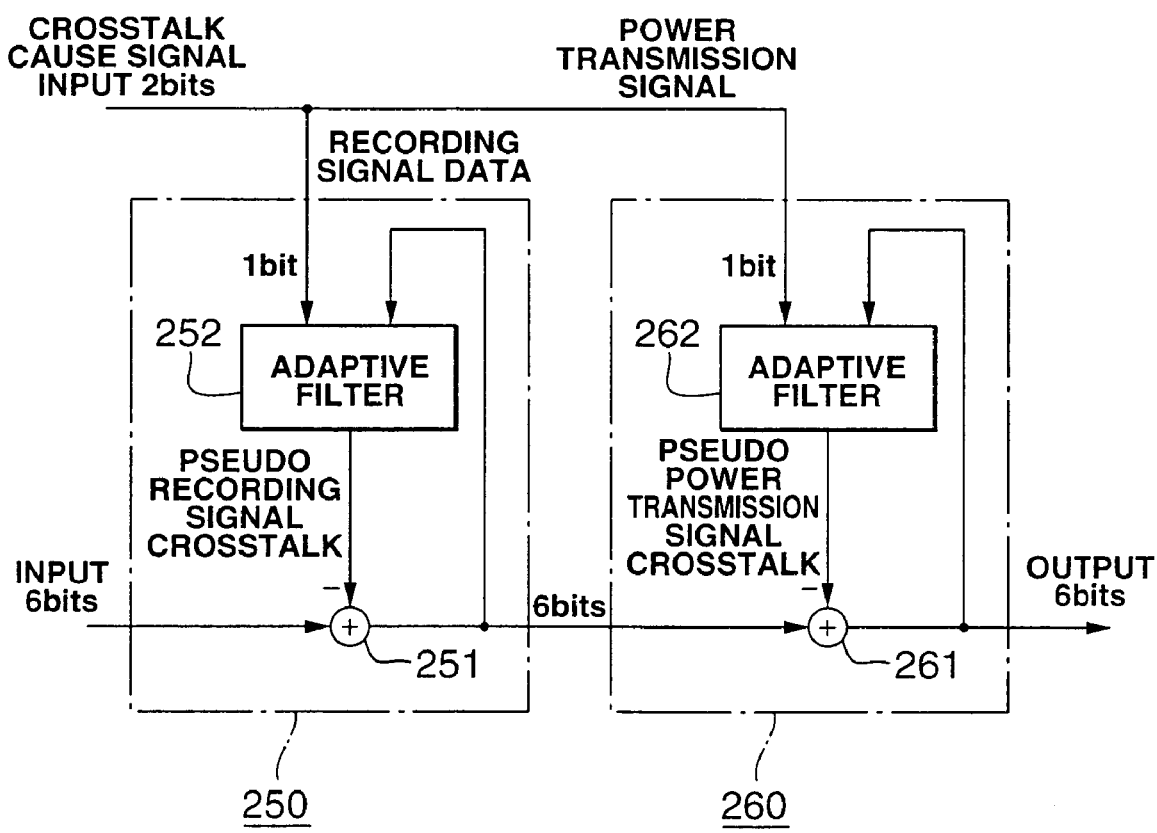
FIG. 12 is a block diagram showing the configuration of crosstalk canceller in the tape streamer.

Here, as the crosstalk cancellers 246A, 246B, there is used, e.g., crosstalk canceller of the configuration as shown in FIG. 12.

Namely, the crosstalk canceller 246 shown in FIG. 12 is composed of first and second crosstalk canceling circuits 250, 260 which are cascade-connected.

The first crosstalk canceling circuit 250 comprises a subtraction circuit 251 supplied with reproduction RF data, and an adaptive filter 252 for generating pseudo recording signal crosstalk signal from recording data which is crosstalk cause signal, and subtraction output data by the subtraction circuit 251, wherein pseudo recording signal crosstalk signal generated by this adaptive filter 252 is delivered to the subtraction circuit 251 to output reproduction RF data in which the recording signal crosstalk has been cancelled as subtraction output data by the subtraction circuit 251.

The second crosstalk canceling circuit 260 comprises a subtraction circuit 261 supplied with reproduction RF data in which recording signal crosstalk has been cancelled by the first crosstalk canceling circuit 250, and an adaptive filter 262 for generating pseudo power transmission signal crosstalk signal from power transmission signal which is crosstalk cause signal and subtraction output data by the subtraction circuit 261, wherein the pseudo power transmission signal crosstalk signal generated by this adaptive filter 262 is delivered to the subtraction circuit 261 to output reproduction RF data in which recording signal crosstalk has been cancelled as subtraction output data by the subtraction circuit 261.

Reproduction RF data of 2 channels in which power transmission signal crosstalk recording signal and crosstalk have been cancelled by the crosstalk cancelleres 246A, 246B are delivered to reproduction signal discrimination circuits 248A, 248B through PLL circuits 247A, 247B.

The PLL circuits 247A, 247B extract channel clock (reproduction clock) from reproduction RF data in which the recording signal crosstalk and the power transmission signal crosstalk have been cancelled.

The reproduction signal discrimination circuits 248A, 248B binarize reproduction RF data to output them as reproduction data.

Figure 13:
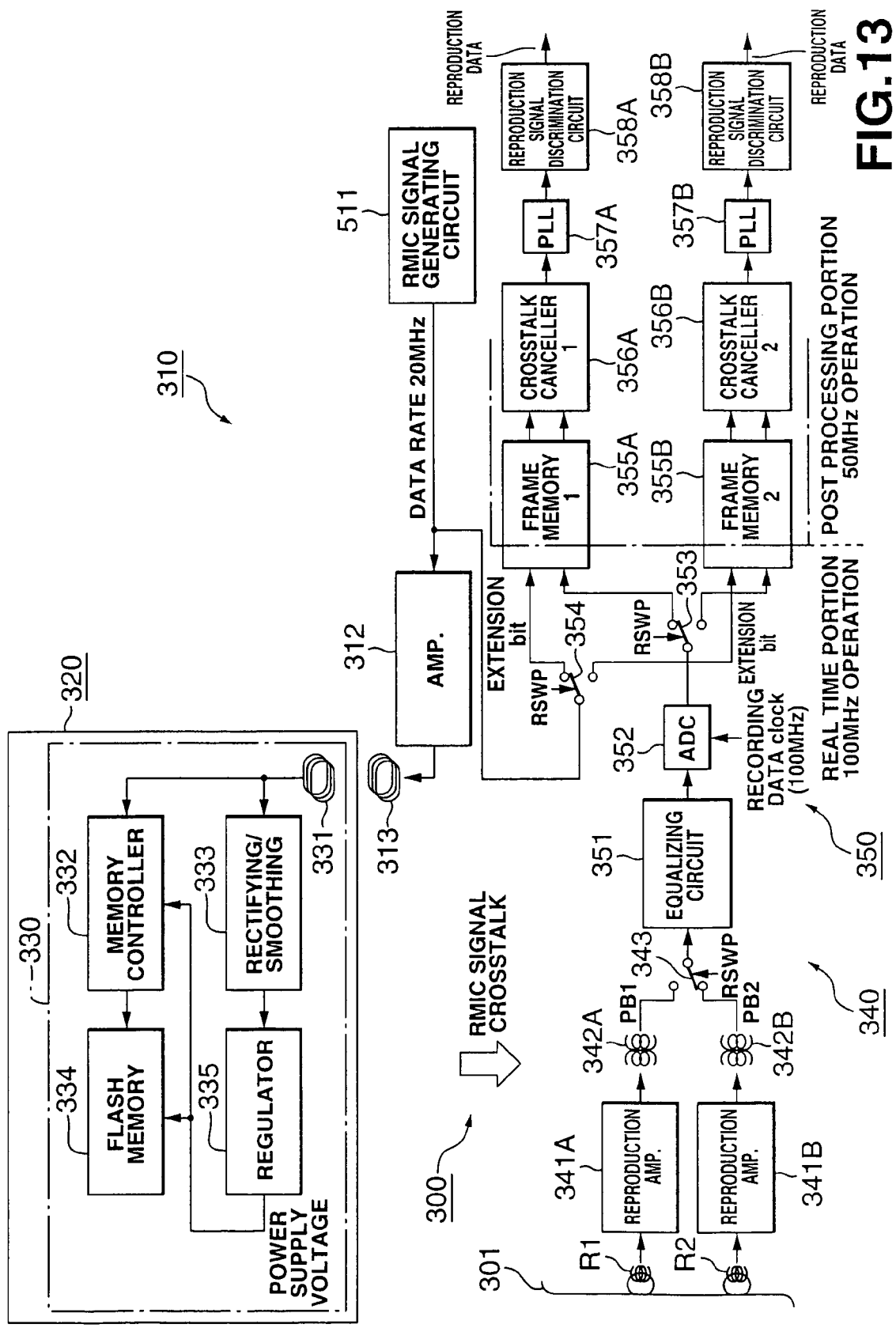
FIG. 13 is a block diagram showing the essential part configuration of tape streamer in which the present invention is applied to cancel RMIC signal crosstalk in the reproducing system.

Then, FIG. 13 is a block diagram showing the essential part configuration of a tape streamer 300 adapted so that the present invention is applied to cancel RMIC (Remote Memory In Cassette) signal crosstalk in the reproducing system.

This tape streamer 300 uses a tape cassette 320 where there is mounted a remote memory chip 330 comprising antenna and wireless communication system circuit, etc. along with non-volatile memory for storing various management information relating to recording/reproduction operation, etc. with respect to a magnetic tape 301, and comprises a RMIC signal recording/reproducing system 310 for executing recording/reproduction of data with respect to the non-volatile memory in the state where there is no contact with the tape cassette 320.

The RMIC signal recording/reproducing system 310 comprises a RF modulation/amplifier circuit 312 for amplifying RMIC signals of data rate of 20 MHz generated by a RMIC signal generating circuit 311 to deliver them to an antenna 313, wherein RMIC signals generated by the RMIC signal generating circuit 311 is transmitted by wireless from the antenna 313 to the remote memory chip 330 mounted at the tape cassette 320. It is to be noted that since the configuration and the operation of the reproducing system in the RMIC signal recording/reproducing system 310 are not directly related to this application, detailed explanation thereof will be omitted.

The remote memory chip 330 mounted at the tape cassette 320 is composed of an antenna 331 provided so as to correspond to the antenna 313 of the RMIC signal recording/reproducing system 311 side, a memory controller 332 and a rectifying/smoothing circuit 333 which are connected to this antenna 331, a flash memory 334 connected to the memory controller 332, and a regulator 335 connected to the rectifying/smoothing circuit 333. The regulator 335 stabilizes rectified/smoothed output of the rectifying/smoothing circuit 333 which rectifies and smoothes RMIC signals received through the antenna 331 to deliver them to the memory controller 332 or the flash memory 334 as a drive power.

The memory controller 332 demodulates RMIC signals, command and/or data which are received through the antenna 331 to access the flash memory 334 in accordance with command to record/reproduce data.

Into the flash memory 334, e.g., manufacturing information and use past record information of the tape cassette 320, and partition information on the magnetic tape, etc. are stored as management information. When management information is stored into the non-volatile memory in this way, various operations very become effective as compared to the case where management information is recorded into a certain specific area on the magnetic tape. Namely, it becomes unnecessary to execute tape traveling for write/read operation of management information. Thus, the time required for read-out or updating of management information is extremely shortened. In other words, it is possible to write/read management information, irrespective of position on the magnetic tape and/or operating state. Thus, application range of management information is broadened so that various and effective control processing can be made.

In a reproducing system 340 in this tape streamer 300, reproduction RF signals of 2 channels obtained by scanning recording tracks of the magnetic tape 301 by a pair of reproducing heads R1, R2 are amplified at reproduction amplifiers 341A, 341B, and are delivered to the fixed drum side through rotary transformers 342A, 342B. The reproduction RF signals thus obtained are delivered to a reproduction processing system 350 through a reproduction head changeover switch 343.

The reproduction head changeover switch 343 is caused to undergo switching control by reproduction head switching signal RSWP in such a manner that reproduction RF signal of the first channel obtained for 180° time period during which the first reproducing head R1 is slidably in contact with the magnetic tape 301, and reproduction RF signal of the second channel obtained for 180° time period during which the second reproducing head R2 is slidably in contact with the magnetic tape 301 is selected. The time period during which the reproduction RF signal of the first channel is selected corresponds to the time period of reproduction head switching signal RSWP=Low. In addition, the time period during which the reproduction RF signal of the second channel is selected corresponds to the time period of reproduction head switching signal RSWP=High.

The reproduction processing system 350 is composed of an equalizing circuit 351 connected to the reproduction changeover switch 343, an Analog to Digital Converter (ADC) 352 supplied with reproduction RF signal equalized by this equalizing circuit 351, a first data distribution switch 353 for distributing reproduction RF data digitized by this ADC 352 to 2 channels, a second data distribution switch 354 for distributing RMIC signals delivered from the RMIC signal recording/reproducing system 310 to 2 channels, frame memories 355A, 355B of 2 channels adapted so that the reproduction RF data is distributed and delivered through the first data distribution switch 353 and RMIC signals are distributed and delivered through the second data distribution switch 354, crosstalk cancellers 356A, 356B, PLL circuits 357A, 357B, and reproduction signal discrimination circuits 358A, 358B.

In this reproduction processing system 350, the equalizing circuit 351 adjusts gain and/or phase frequency response so that channel transfer characteristic of reproduction RF signal delivered through the reproduction head changeover switch 343 results in a desired characteristic. The reproduction RF signal which has been caused to undergo waveform equalization by this equalizing circuit 351 is digitized at the ADC 352 driven by recording clock (100 MHz) of the recording system 310, and is distributed and delivered to the frame memories 355A, 355B of 2 channels through the first data distribution switch 353 as reproduction RF data.

Here, in the frame memories 355A, 355B, extension bits of 1 bit for storing RMIC signals as crosstalk cause signals are provided.

RMIC signals are distributed into signals of 2 channels by the second data distribution switch 354, and the signals thus distributed are delivered to respective extension bits of the frame memories 355A, 355B.

At the crosstalk cancellers 356A, 356B, with respect to reproduction RF data of 2 channels stored in the frame memories 355A, 355B, RMIC signal crosstalk is cancelled by post process on the basis of RMIC signals stored as crosstalk cause signals in extension bits of the frame memories 355A, 355B.

Here, as the crosstalk cancellers 356A, 356B, crosstalk canceller of the above-described configuration shown in FIG. 9 is used.

Reproduction RF data of 2 channels in which RMIC signal crosstalk has been cancelled by the crosstalk cancellers 356A, 356B are delivered to the reproduction signal discrimination circuits 358A, 358B through the PLL circuits 357A, 357B.

The PLL circuits 357A, 357B extract channel clock (reproduction clock) from reproduction RF data in which RMIC signal have been cancelled.

The reproduction signal discrimination circuits 358A, 358B binarize reproduction RF data to output them as reproduction data.

It is to be noted that while binary signal series is stored in extension bits of 1 bit of respective frame memories as cause signals of crosstalk signals included in reproduction signal in the above-described respective embodiments, extension bit may be caused to be n bits to thereby store multi-value signal series as cause signals of the crosstalk signals thus to cope with multi-value signal series.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and the spirit of the present invention as set forth and defined by the appended claims.

Industrial Applicability

As described above, in accordance with the present invention, error rate of Read After Write operation is improved, and sense (detection) accuracy of head stain and/or tape defective which is the object of the Read After Write operation. Thus, reliability of the equipment can be improved.

Moreover, since power transmission signal and/or RMIC signal give bad influence also at the time of reproduction, these signals are cancelled so that reproduction error can reduced. Thus, recording density is increased, and large capacity can be realized.

Further, since implementation can be made by simple shield, miniaturization of equipment can be realized, and realization of low cost can be made.

In the present invention, the crosstalk canceller having features as described above is realized by post processing circuit, thereby making it possible to share in the benefit of crosstalk canceller also in equipments of high transfer rate.

The invention claimed is:

1. A recording/reproducing apparatus adapted for performing Read After Write operation for signals through a recording medium, the recording/reproducing apparatus comprising:
    first distribution means for distributing reproduction signals obtained from the recording medium to plural channels;
    second distribution means for distributing cause signals of crosstalk signals included in the reproduction signals obtained from the recording medium to plural channels;
    memory means of plural channels for storing, every channel, the reproduction signals and the cause signals which have been distributed to plural channels by the first and second distribution means; and
    crosstalk cancellers of plural channels for generating pseudo crosstalk signals of respective channels on the basis of the reproduction signals and the cause signals of respective channels which are read out from an extension bit or bits of the memory means of plural channels to cancel crosstalk signals included in the reproduction signals of respective channels,
    wherein, in a reproducing system, there are obtained reproduction signals of plural channels in which crosstalk signals have been cancelled every channel by the crosstalk cancellers of plural channels.

2. The recording/reproducing apparatus as set forth in claim 1, wherein the second distribution means distributes and delivers binary signal series to the extension bit or bits of the memory means of plural channels as cause signals of crosstalk signals included in reproduction signals obtained from therecording medium.

3. The recording/reproducing apparatus as set forth in claim 1, wherein the second distribution means distributes and delivers multi-value signal series to the extension bit or bits of the memory means of plural channels as cause signals of crosstalk signals included in reproduction signals obtained from the recording medium.

4. The recording/reproducing apparatus as set forth in claim 1,
    wherein the second distribution means distributes and delivers plural kinds of cause signals of crosstalk signals included in reproduction signals obtained from the recording medium to the extension bit or bits of the memory means of plural channels, and
    wherein, in the reproducing system, there are obtained reproduction signals of plural channels in which plural kinds of crosstalks included in reproduction signals obtained from the recording medium have been cancelled every channel by the crosstalk cancellers of plural channels.

5. The recording/reproducing apparatus as set forth in claim 1,
    wherein the second distribution means distributes and delivers recording signals from a recording system for recording signals with respect to the recording medium to the extension bit or bits of the memory means of plural channels as cause signals of crosstalk signals included in reproduction signals obtained from the recording medium, and
    wherein, in the reproducing system, there are obtained reproduction signals of plural channels in which recording signal crosstalks included in reproduction signals obtained from the recording medium have been cancelled every channel by the crosstalk cancellers of plural channels.

6. The recording/reproducing apparatus as set forth in claim 1,
    wherein the second distribution means distributes and delivers power transmission signals from a power transmission system to the extension bit or bits of the memory means of plural channels as cause signals of crosstalk signals included in reproduction signals obtained from the recording medium, and
    wherein, in the reproducing system, there are obtained reproduction signals of plural channels in which power transmission signal crosstalks included in reproduction signals obtained from the recording medium have been cancelled every channel by the crosstalk cancellers of plural channels.

7. The recording/reproducing apparatus as set forth in claim 1, comprising
    a RMIC (Remote Memory In Cassette) signal recording/reproducing system in which there is used a tape cassette within which there is mounted a remote memory chip comprising an antenna and a wireless communication system circuit, etc. along with a non-volatile memory for storing various management information relating to recording/reproducing operation, etc. with respect to a magnetic tape as the recording medium, and serving to execute recording/reproducing operation of data with respect to the non-volatile memory in the state where there is no contact with the tape cassette, wherein the second distribution means distributes and delivers RMIC signals from the RMIC signals recording/reproducing system to the extension bit or bits of the memory means of plural channels as cause signals of crosstalk signals included in reproduction signals obtained from the recording medium, and wherein, in the reproducing system, there are obtained reproduction signals of plural channels in which RMIC signal crosstalks included in reproduction signals obtained from the recording medium have been cancelled every channel by the crosstalk cancellers of plural channels.

8. The recording/reproducing apparatus as set forth in claim 1, wherein the crosstalk canceller is composed of an adaptive filter for generating a pseudo crosstalk signals from cause signals which is read out from the extension bit or bits of the memory means and reproduction signals in which the crosstalk signals have been cancelled, and arithmetic means for subtracting the pseudo crosstalk signals from reproduction signals which is read out from the memory means to thereby generate reproduction signals in which the crosstalk signals have been cancelled.

9. A crosstalk cancellation method of canceling crosstalk included in reproduction signals obtained in a reproducing system of a recording/reproducing apparatus adapted for performing Read After Write operation for signals through a recording medium, the crosstalk cancellation method comprising:

distributing reproduction signals obtained from the recording medium to plural channels to store them into memory means of plural channels, and distributing cause signals of crosstalk signals included in the reproduction signals obtained from the recording medium to plural channels to store them into an extension bit or bits of memory means of plural channels; and generating pseudo crosstalk signals of respective channels on the basis of reproduction signals and cause signals of respective channels which are read out from the memory means of plural channels to cancel, every channel, crosstalk signals included in the reproduction signals of respective channels.

* * * * *